United States Patent [19]

Buchanan

[11] Patent Number: 4,999,081
[45] Date of Patent: Mar. 12, 1991

[54] CUTTING AND HEAT SEALING DIE ASSEMBLY

[75] Inventor: Bradley H. Buchanan, Ross, Calif.
[73] Assignee: Float Machines Inc., Novato, Calif.
[21] Appl. No.: 420,541
[22] Filed: Oct. 11, 1989
[51] Int. Cl.$^5$ .............................................. B32B 31/18
[52] U.S. Cl. ..................................... 156/515; 156/530; 156/583.1; 156/583.4; 156/251
[58] Field of Search ............ 156/251, 515, 530, 583.1, 156/583.4; 493/189, 194, 196, 203, 209

[56] References Cited

U.S. PATENT DOCUMENTS

| | | | |
|---|---|---|---|
| 2,589,756 | 3/1952 | Waters | 493/209 |
| 3,868,291 | 2/1975 | Benz et al. | 156/515 |
| 4,000,029 | 12/1976 | Michaels | 156/583.4 |
| 4,140,046 | 2/1979 | Marbach | 156/515 |
| 4,430,069 | 2/1984 | Carlisle | 493/209 |
| 4,545,844 | 10/1985 | Buchanan | 156/530 |

Primary Examiner—Caleb Weston
Attorney, Agent, or Firm—Phillips, Moore, Lempio & Finley

[57] ABSTRACT

An apparatus for cutting and heat sealing a pair of overlying heat-sealable panels together comprises a conveyer for moving a pair of superimposed webs of panel material along a linear path and into a cutting and sealing station. A combined cutting and sealing die assembly includes a cutting die for cutting the panels out of the webs and a sealing die for sealing peripheral edges of the superimposed panels together. A heater element is mounted on each of the dies to heat them to their respective cutting and sealing temperatures with the dies being thermally insulated to prevent heat transfer therebetween. A plurality of spring clips attach the dies together to permit thermal expansion of the cutting die relative to the sealing die.

19 Claims, 4 Drawing Sheets

CUTTING AND HEAT SEALING DIE ASSEMBLY

TECHNICAL FIELD

This invention relates generally to an apparatus for forming an article out of a pair of superimposed heat-sealable panels and more particularly to a combined cutting and heat sealing die assembly for simultaneously effecting the cutting and sealing operations.

BACKGROUND OF THE INVENTION

The use of heat-sealable plastic coatings, such as polyethylene, has made possible the formation of variously configured articles composed of a pair of superimposed panels that are heat-sealed together. U.S. Pat. No. 4,545,844, for example, discloses apparatus wherein a combined cutting and heat sealing die assembly functions to simultaneously cut a pair of superimposed panels into their desired configuration and then heat seal peripheral edges of the panels together. The cutting and sealing dies are secured together by fasteners and both dies are heated by a common heater element secured on the cutting die.

The dies are each composed of a heat conducting metallic material, such as aluminum, with the cutting die being heated to a higher temperature (e.g., 600° F.) then the temperature of the sealing die (e.g., 400° F.). Thus, thermal expansion of the heating die will be greater than that of the sealing die. As a result, the structural integrity of the fasteners securing the dies together can be destroyed to shorten the expected service life of the die assembly. Further, the relative difference in the thermal expansions of the dies can create air gaps therebetween which adversely affects the critical thermal balance between the dies, i.e., heat conduction from the cutting die to the sealing die. In addition, combined cutting and sealing die assemblies of this type are difficult to fabricate and service for the purpose of continuously maintaining such thermal balance. Also, the assemblies are not "universal" in that they require modification to form articles out of heat-sealable panels having different physical and compositional make-ups with varying dielectric properties.

SUMMARY OF THE INVENTION

An object of this invention is to provide an improved cutting and heat sealing die assembly for efficiently and simultaneously cutting and sealing a pair of superimposed heat-sealable panels together.

The cutting and heat sealing die assembly comprises cutting means, including a cutting die, for cutting the panels into their desired configuration at a predetermined cutting temperature and sealing means, including a sealing die, for sealing the panels together at a predetermined sealing temperature that is less than the cutting temperature. Mounting means are provided for attaching the cutting means to the sealing means for permitting thermal expansion and movement of the cutting die relative to the sealing die.

In the preferred embodiment of this invention, each of the cutting and sealing means has a heater element secured thereon and the mounting means includes a plurality of tension springs, specifically disclosed in the form of spring clips, for biasing the cutting and sealing dies towards each other for permitting limited relative expansion therebetween.

BRIEF DESCRIPTION OF THE DRAWINGS

Other objects and advantages of this invention will become apparent from the following description and accompanying drawings wherein.

DESCRIPTION OF THE PREFERRED EMBODIMENT

Figure 1:
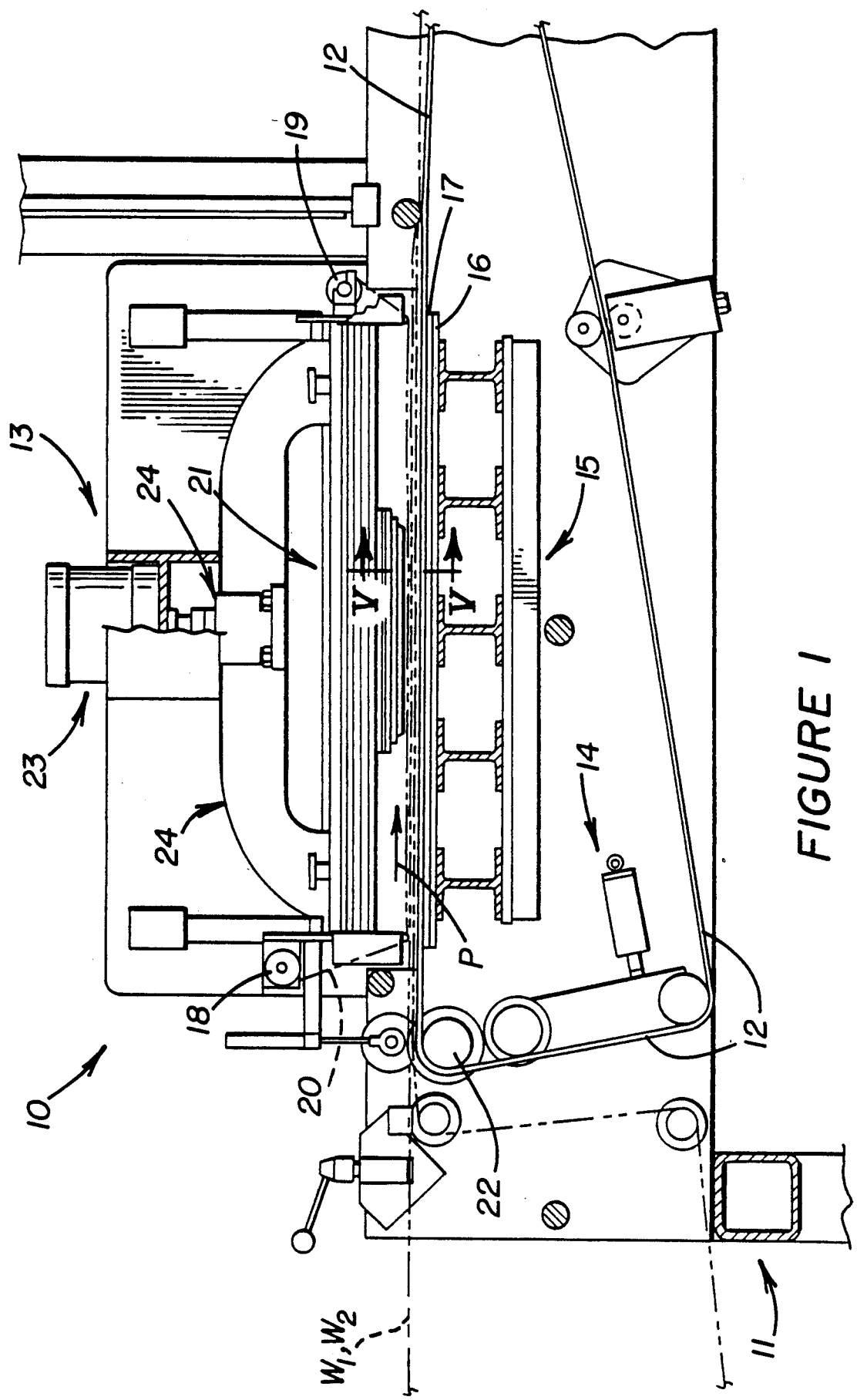
FIG. 1 is the side elevational view of an apparatus for forming articles, including a cutting and heat sealing die assembly embodying this invention.
Figure 2:
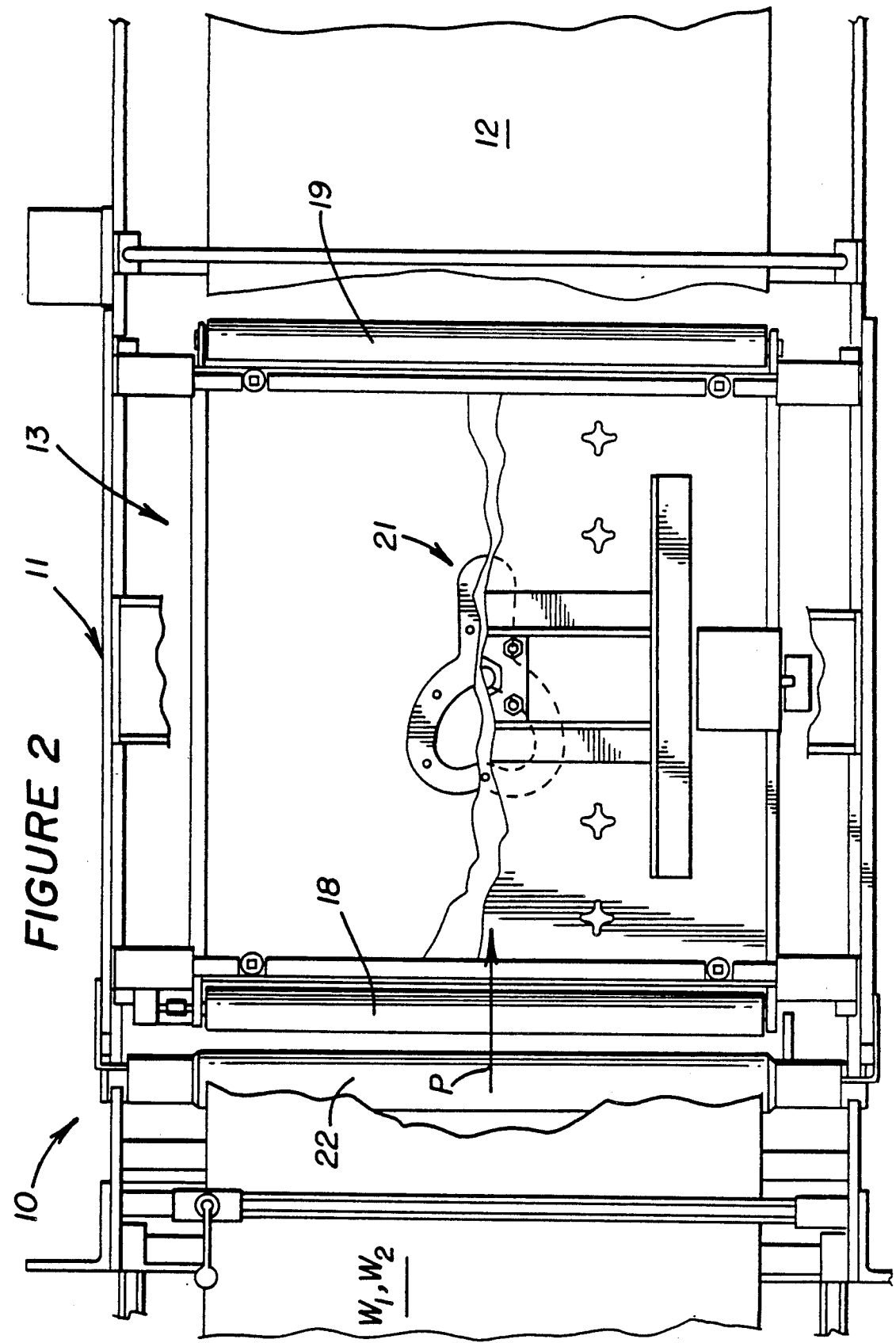
FIG. 2 is a top plain view of the apparatus.
Figure 3:
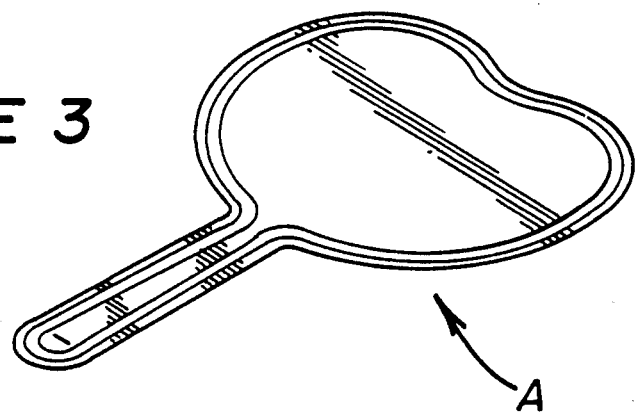
FIG. 3 illustrates an article formed by the apparatus.

FIGS. 1 and 2 illustrates an apparatus 10 for forming an article A (FIG. 3) from a pair of super-imposed and heat-sealable panels, cut from a pair of overlying webs $W_1$ and $W_2$. The webs are fed from rolls (not shown) suitably mounted on a stationery frame 11 for movement along a linear path P and onto a conveyor belt 12. The superimposed webs are then moved by the conveyor belt to a cutting and sealing station 13, positioned adjacent to path P.

Each web may comprise a well-known composite laminate, such as the type disclosed in U.S. Pat. No. 4,077,588. In particular, outer and inner layers of each web may constitute a plastic coating, such as polyethylene, with an intermediate layer being composed of a metal, such as aluminum. The inner layers of the webs are heat sensitive to reactivate (melt) at a temperature approximating 400° F. whereby, after cutting into panel form, peripheral edges of the panels can be heat-sealed together.

As further shown in FIG. 1, conveyor belt 12 is adapted to be suitably tensioned by a standard pneumatic belt tensioner 14. Frame 11 includes a sub-frame 15 having a steel support plate 16 secured thereon. An elastomeric back-up pad 17 is secured on the support plate to underlie conveyor belt 12. A pair of rollers 18 and 19 are mounted on frame 11 to automatically advance a Teflon (polytetrafluoroethylene) film between conveyor belt 12 and a combined cutting and heat sealing die assembly 21, overlying the conveyor belt.

Figure 4:
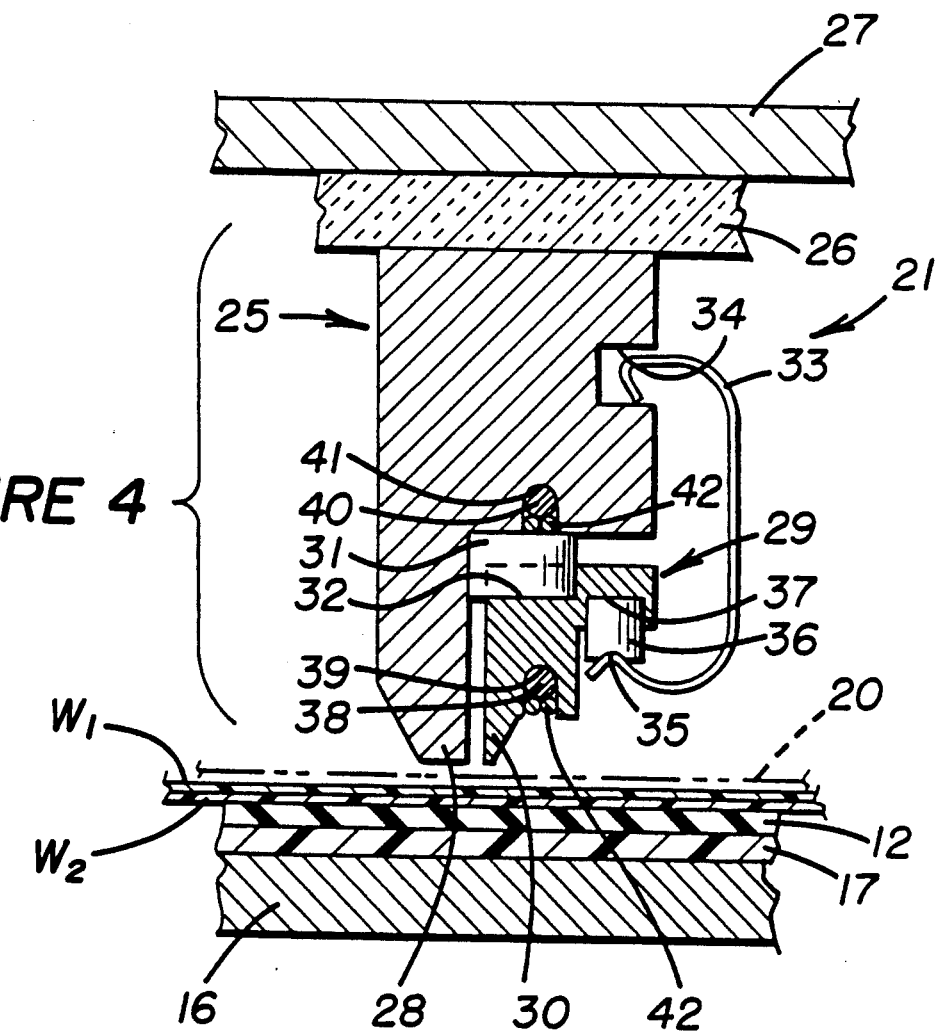
FIG. 4 is an enlarged sectional view through the cutting and heat sealing die assembly, taken in the direction of arrows V—V in FIG. 1.

Referring to FIGS. 1 and 4, superimposed webs $W_1$ and $W_2$ are moved under cutting and heat sealing die assembly 21 by suitably arranged drive rolls (not shown) and conveyor belt 12, driven by a drive foll 22. The drive rolls for the webs and conveyor belt are synchronized to move the webs and conveyor belt at synchronized linear speeds along path P and to periodically stop them beneath assembly 21 which forms article A (FIG. 2).

Cutting and heat sealing die assembly 21 functions to simultaneously cut webs $W_1$ and $W_2$ at a predetermined cutting temperature (e.g., 600° F.), to define the panels composing the article and to simultaneously heat seal peripheral edges of the panels together at a predetermined sealing temperature (e.g., 400° F.), substantially lower than the cutting temperature. A standard double-acting air cylinder 23 is suitably mounted o frame 11 to overlie assembly 21 and has its rod end 24 secured to a support bracket 25 for the cutting and heat sealing die assembly.

Figure 5:
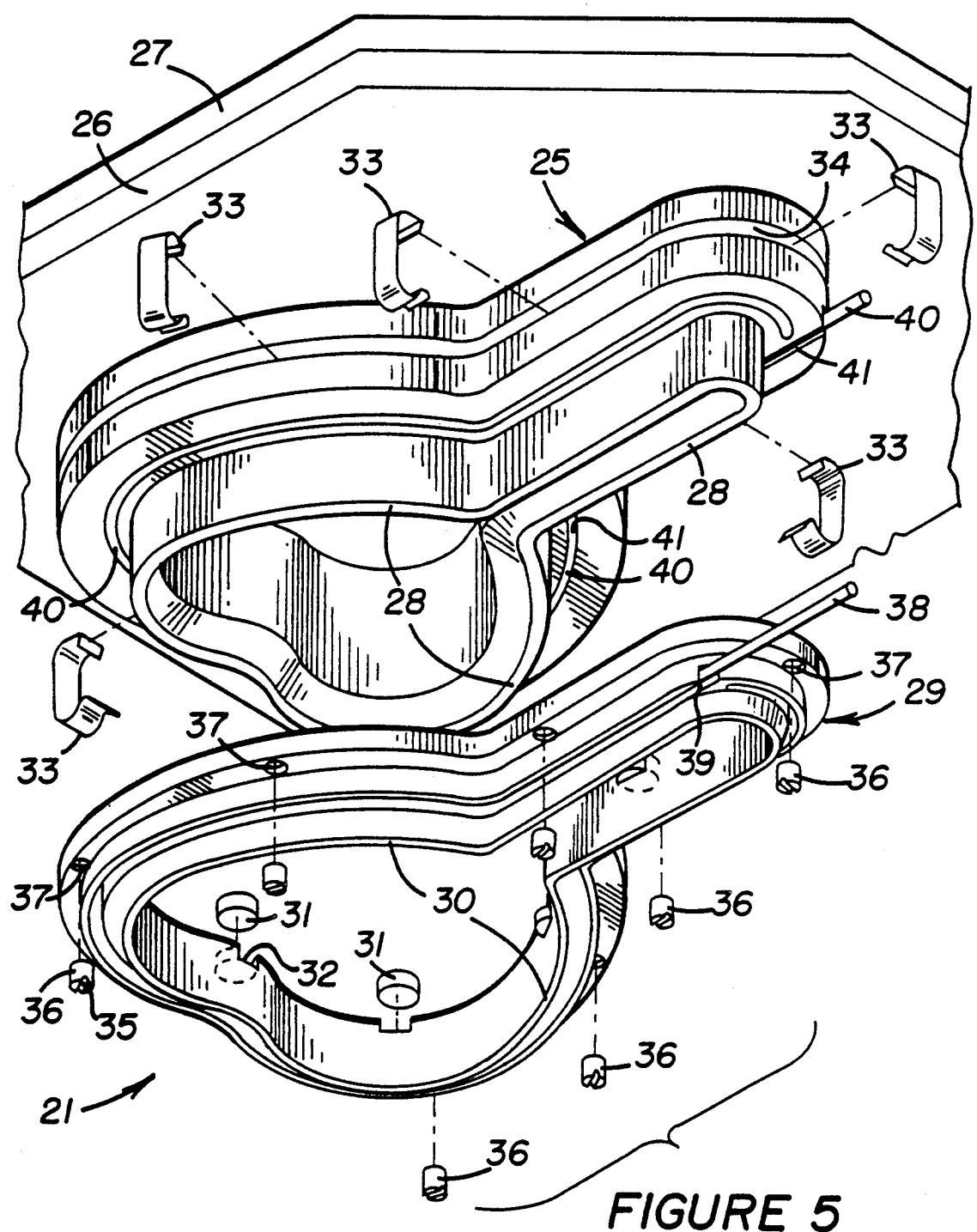
FIG. 5 is an exploded isometric view of the cutting and heat sealing die assembly.

Referring to FIGS. 4 and 5, assembly 21 comprises an aluminum sealing die 25 suitably secured beneath a thermo-insulating pad or panel 26. The pad, in turn, is secured beneath a steel support plate 27 by standard fasteners. The support plate is suitably secured beneath support bracket 24 (FIG. 1) for simultaneous vertical movement therewith.

Insulating pad 26 may be composed of a rigid insulation material, such as Maranite, manufactured by Johns-Manville. The primary purpose of the insulating pad is to thermally insulate sealing die 25 to prevent conduction of heat from the die to steel support plate 27. The periodic extension and retraction of cylinder 23 is suitably controlled in a conventional manner by the integrated control system for the apparatus.

As shown in FIGS. 4 and 5, sealing die 25 has a generally inverted L-shaped cross-section and terminates at its distal end at a sealing tip 28. A cut-out is defined on the outer side of the sealing die to accommodate a cutting die 29 in nested relationship therein. It should be understood that the cutting and sealing dies may take any desired form, such as circular, rectangular or irregular, to conform to the desired configuration of a particular article formed thereby.

The cutting die terminates at its distal end at a cutting edge 30 that is substantially coincident, adjacent and outwardly spaced from sealing tip 28 of the sealing die. First insulation means for mounting the cutting die on the sealing die and for thermally insulating the dies from each other comprises a plurality of spaced ceramic insulators 31. The insulators are each mounted and retained within a cut-out 32, defined on an upper side of the cutting die, and are positioned to vertically and laterally space the cutting and sealing dies from each other. The standard insulators or buttons have a very high resistance to compression and exhibit superior law dielectric properties.

As further shown in FIGS. 4 and 5, retaining means for attaching and resiliently clamping the cutting and sealing dies together and for permitting thermal expansion and movement of the cutting die relative to the sealing die comprises a plurality of spaced and tensioned spring clips 33. Each spring clip is generally C-shaped and has its first or upper end mounted and retained in a cut-out 34 defined around an outer side of sealing die 25. The second or lower end of each spring clip engages within a shallow recess 35, formed on an outer side of a ceramic insulator 36. The spaced plurality of second ceramic insulators 36, comprising second insulation means, are each mounted within a bore 37 defined on an underside of cutting die 29. Alternatively, ceramic insulators 36 could be mounted within bores defined within cut-out 34 of the sealing die to thermally insulate the dies from each other at the spring clips.

Each of the cutting and sealing dies are provided with heater means mounted thereon for heating the dies to their respective cutting and sealing temperatures. The heating means for the cutting die comprises a heater element 38 mounted in a groove 39, formed on an underside of the cutting die. A separate heater element 40 is mounted in a groove 41, formed on an underside of the sealing die. The heater elements can each constitute the well-known RBN Series Tubular Heater, manufactured by the Watlow Corp. of Saint Louis, Missouri. Each heating element is fixedly secured within its respective groove by a pair of side to side mechanically deformed (swaged) metal rods 42 that overlie and lock the heater element in the groove (FIG. 4).

From the above description and referring to FIG. 4, when the die assembly is lowered into engagement with webs $W_1$ and $W_2$, cutting edge 30 of the cutting die will cut the webs to form the overlying panels. Simultaneously therewith, sealing tip 28 of the sealing die will engage the panels, inwardly of the cut lines, to seal peripheral edges of the panels together. Heater elements 38 and 40 will heat the cutting and sealing dies to their respective cutting and sealing temperatures with ceramic insulators 31 and 36 functioning to thermally isolate the dies from each other.

Spring clips 33 are sufficiently flexible to permit the cutting die to expand relative to the sealing die. The construction and arrangement of the insulators aids in the retention of the dies in their aligned relationship during the cutting and sealing operation. The individual heater elements will insure that the required thermal balance is maintained between the dies to adapt the die assembly for universal application, i.e., for the cutting and sealing of a wide variety of materials having different dielectric and physical properties. In particular, the overall control system of the apparatus can be programmed to selectively vary the heat output from each of the heater elements whereby physical changes to the die assembly are not required.

I claim:

1. In an apparatus for forming an article out of a pair of superimposed heat-sealable panels comprising
   conveyor means for moving a pair of superimposed webs along a path, and
   a cutting and sealing station positioned adjacent to said path for receiving said webs, said cutting and sealing station comprising
   cutting means, including a cutting die, for simultaneously cutting said webs at a predetermined cutting temperature to form said panels,
   sealing means, including a sealing die, for sealing said panels together at a predetermined sealing temperature, less than said cutting temperature,
   retaining means for attaching said cutting means to said sealing means and for permitting thermal expansion and movement of said cutting die, relative to said sealing die, and
   first insulation means for mounting said cutting die on said sealing die and for thermally insulating said cutting die from said sealing die.

2. The apparatus of claim 1 wherein said cutting means further comprises heater means solely mounted on said cutting die for heating said cutting die to said cutting temperature.

3. The apparatus of claim 2 wherein said cutting die comprises a cutting edge formed on a distal end thereof and means defining a groove adjacent to said cutting edge, said heater means comprising a heater element fixedly mounted in said groove.

4. The apparatus of claim 1 or 3 wherein said sealing means further comprises means defining a groove in said sealing die and a heater element mounted in such groove.

5. The apparatus of claim 4 further comprising means for securing each said heater element in each said respective groove, including a pair of mechanically deformed rods overlying and locking said heater element in said groove.

6. The apparatus of claim 1 further comprising means defining a cut-out on the under and outer sides of said sealing die, when said sealing die is viewed in cross-section, and wherein said cutting die is nested within said cut-out and said retaining means comprising a plurality of spring clips mounted in clamping relationship on the outer sides of said cutting and sealing dies.

7. The apparatus of claim 1 wherein said first insulation means comprises a plurality of spaced first ceramic insulators.

8. The apparatus of claim 7 further comprising means defining a plurality of cut-outs on an upperside of said cutting die for retaining respective ones of said first ceramic insulators therein.

9. The apparatus of claim 1 further comprising second insulation means for thermally insulating said retaining means from at least one of said cutting and sealing dies.

10. The apparatus of claim 9 wherein said second insulation means comprises of plurality of spaced second ceramic insulators mounted on an underside of said cutting die, said retaining means engaging an outerside of each of said second ceramic insulators.

11. The apparatus of 1 wherein said retaining means comprises a plurality of spaced and tensioned spring clips.

12. The apparatus of claim 11 wherein each said spring clips is generally C-shaped.

13. The apparatus of claim 11 further comprising means defining a cut-out formed on an outer side of said sealing die for retaining a first end of each said spring clip therein.

14. The apparatus of claim 13 further comprising a plurality of spaced thermal insulators mounted on an underside of said cutting die and wherein a second end of each said spring clip engages a respective one of said insulators.

15. In an apparatus for forming an article out of a pair of superimposed heat-sealable panels comprising
conveyor means for moving a pair of superimposed webs along a path, and
a cutting and sealing station positioned adjacent to said path for receiving said webs, said cutting and sealing station comprising
cutting means, including a cutting die, for simultaneously cutting said webs at a predetermined cutting temperature to form said panels,
sealing means, including a sealing die, for sealing said panels together at a predetermined sealing temperature, less than said cutting temperature, and
retaining means for attaching said cutting means to said sealing means and for permitting thermal expansion and movement of said cutting die, relative to said sealing die, said retaining means comprising a plurality of spaced and tensioned spring clips.

16. A combined cutting and sealing die assembly comprising
a heat conductive cutting die terminating at its distal end at a cutting edge,
first heater means mounted on said cutting die for heating said cutting edge to a predetermined cutting temperature,
a heat conductive sealing die terminating at its distal end at a sealing tip disposed adjacent to and laterally spaced inwardly from said cutting edge,
second heater means mounted on said sealing die for heating said sealing tip to a predetermined sealing temperature,
insulation means for thermally insulating said cutting and sealing dies from each other, and
retaining means for attaching said cutting and sealing dies together and for permitting thermal expansion and movement of said cutting die, relative to said sealing die, said retaining means comprising tensioned spring means for resiliently clamping said cutting and sealing dies together and for biasing said cutting and sealing dies toward each other.

17. A combined cutting and sealing die assembly comprising
a heat conductive cutting die terminating at its distal end at a cutting edge,
first heater means mounted on said cutting die for heating said cutting edge to a predetermined cutting temperature,
a heat conductive sealing die terminating at its distal end at a sealing tip disposed adjacent to and laterally spaced inwardly from said cutting edge,
second heater means mounted on said sealing die for heating said sealing tip to a predetermined sealing temperature,
insulation means for mounting said cutting die on said sealing die and for thermally insulating said cutting and sealing dies from each other, and
retaining means for attaching said cutting and sealing dies together and for permitting thermal expansion and movement of said cutting die, relative to said sealing die.

18. In an apparatus for forming an article out of a pair of superimposed heat-sealable panels comprising
conveyor means for moving a pair of superimposed webs along a path, and
a cutting and sealing station positioned adjacent to said path for receiving said webs, said cutting and sealing station comprising
cutting means, including a cutting die, for simultaneously cutting said webs at a predetermined cutting temperature to form said panels, said cutting means further comprising heater means solely mounted on said cutting die for heating said cutting die to said cutting temperature and wherein said cutting die comprises a cutting edge formed on a distal end thereof and means defining a groove adjacent to said cutting edge, said heater means comprising a heater element fixedly mounted in said groove,
sealing means, including a sealing die, for sealing said panels together at a predetermined sealing temperature, less than said cutting temperature, and
retaining means for attaching said cutting means to said sealing means and for permitting thermal expansion and movement of said cutting die, relative to said sealing die.

19. In an apparatus for forming an article out of a pair of superimposed heat-sealable panels comprising
conveyor means for moving a pair of superimposed webs along a path, and
a cutting and sealing station positioned adjacent to said path for receiving said webs, said cutting and sealing station comprising
cutting means, including a cutting die, for simultaneously cutting said webs at a predetermined cutting temperature to form said panels,
sealing means, including a sealing die, for sealing said panels together at a predetermined sealing temperature, less than said cutting temperature, said sealing means further comprising means defining a groove in said sealing die and a heater element mounted in said groove, and
retaining means for attaching said cutting means to said sealing means and for permitting thermal expansion and movement of said cutting die, relative to said sealing die.

* * * * *